United States Patent [19]

Harley et al.

[11] Patent Number: 4,957,386
[45] Date of Patent: Sep. 18, 1990

[54] JOINING DEVICE

[75] Inventors: David N. Harley, Bournemouth, England; James M. Holler, Jamestown, N.Y.

[73] Assignee: Titus Tool Company Limited, Buckinghamshire, England

[21] Appl. No.: 140,763

[22] Filed: Jan. 4, 1988

[51] Int. Cl.⁵ .............................................. F16B 9/02
[52] U.S. Cl. .................................... 403/231; 403/245; 403/407.1
[58] Field of Search ............... 403/231, 245, 253, 254, 403/407.1, 263, 326, 362

[56] References Cited

U.S. PATENT DOCUMENTS

| 4,325,649 | 4/1982 | Röck | 403/231 |
| 4,360,282 | 11/1982 | Koch | 403/231 X |
| 4,487,522 | 12/1984 | Appleby et al. | |
| 4,505,610 | 3/1985 | Röck et al. | 403/231 |
| 4,564,306 | 1/1986 | Röck et al. | 403/231 X |
| 4,616,953 | 10/1986 | Gomes | 403/407.1 |

FOREIGN PATENT DOCUMENTS 2855216 7/1979 Fed. Rep. of Germany ...... 403/231

Primary Examiner—Peter M. Cuomo
Attorney, Agent, or Firm—Lowe, Price, LeBlanc, Becker & Shur

[57] ABSTRACT

A joining device for joining panels at right angles to each other comprises an element having a head and a shank secured into one of the panels with the head and part of the shank projecting from an edge thereof. A plug-like body portion or holding member is fitted in a recess in a major surface of the other panel. The plug-like member has an end face exposed to the major panel surface with an opening extending axially therein from the end face to receive and surround the head. An inward projection is located within the opening. A securing member is located within the body portion adjacent the opening, and includes a shoulder-forming portion positioned within the body portion to form a shoulder on the other side of the opening relative to the projection. The distance between the shoulder-forming portion and the projection is less than the diameter of the head. The head can then be inserted into the opening and forced between the shoulder and the projection until the head snaps in behind the shoulder and the projection. The securing member is then operated from the end face to engage the head to apply a force thereto to draw the head inwardly relative to the opening to tighten the joint formed by the panels.

9 Claims, 3 Drawing Sheets

JOINING DEVICE

This invention relates to devices for joining furniture panels.

In particular, it is concerned with devices of the general kind disclosed in U.S. Pat. No. 4,487,522.

These devices are sometimes known as "plug and dowel" or "plug and pin" joining devices and are used for joining panels at right angles to each other. Each device comprises an element having a head and a shank which is secured into the edge of one panel with its head and part of the shank projecting from the panel edge. A holding member is fitted into a recess provided in a major face of the other panel. The holding member comprises a plug-like body portion having an end face arranged to be exposed at the major panel surface and having an opening extending therein axially from said end face to receive and surround the head. After the element with the head and shank and the holding member have been secured into their respective panels, the panels are brought together so that the head enters into the opening in the holding member, and a securing member which is located within the body portion and adjacent to the opening is then tightened so as to engage the head and draw it inwardly relative to the opening to tighten the joint, with one panel in edgewise contact with, and at right angles to, the other.

The joining device of this type described in U.S. Pat. No. 4,487,522 has proved very satisfactory but it has been found that at the stage where the two parts of the joining device have been brought into engagement with each other, but the joining device has not yet been tightened to complete the joint, it is possible, depending upon the relative positions of the two panels, for the joining device parts to fall out of engagement by gravity, or for the head of the element to be easily levered out of the opening in the plug or holding member if one of the panels is allowed to move angularly relative to the other in one direction. Angular rotation between the panels in the other direction does not normally result in disengagement because there is a projection within the opening in the holding member which engages behind one side of the head of the head-and-shank element. This inadvertent disengagement is a disadvantage because a person assembling the joint (typically a person assembling knocked-down furniture from a kit, in the home) has to make sure that once the joining device has been brought into engagement he holds it in engagement until he has completed the tightening operation. If he leaves it, for example to pick up a screwdriver or perform some other operation, the joining device may fall out of engagement and he will have to start the assembly operation again.

The present invention aims to provide a joining device which substantially overcomes this problem.

The invention provides a joining device for joining panels at right angles to each other, comprising an element having a head and a shank and adapted to be secured into one of said panels with said head and part of the shank projecting from an edge thereof, a holding member adapted to be fitted in a recess provided in a major surface of the other of said panels, said holding member comprising a plug-like body portion having an end face arranged to be exposed at said major panel surface and having an opening extending therein axially from said end face to receive and surround said head, an inward projection within said opening, and a securing member located within said body portion and adjacent to said opening, the securing member having a shoulder-forming portion and being so positioned within said body portion that the shoulder-forming portion forms a shoulder on the other side of the opening relative to the projection, the distance between the shoulder-forming portion of the securing member and the projection on the body portion being less than the diameter of said head so that said head can be inserted into said opening and then forced between the shoulder and the projection until the head snaps in behind the shoulder and the projection, said securing member being operable from said end face and effective when operated to engage said head to apply a force thereto in a manner to draw said head inwardly relative to said opening to tighten the joint formed by said panels.

In using a joining device in accordance with the invention, initial engagement of the two parts of the device involves forcing the head between the shoulder and the projection until it snaps in behind them. As a result, the head is sufficiently well pre-located within the holding member that in normal circumstances it will not be withdrawn by the action of gravity alone, nor by the weight of one of the panels tending to rotate one panel relative to the other. Hence, the task of assembly is made easier for the user because there is less chance of joints falling apart before the user has completed the tightening of them.

In order that the invention may be more clearly understood, a preferred embodiment will be described with reference to the accompanying diagrammatic drawings, in which.

Figure 1:
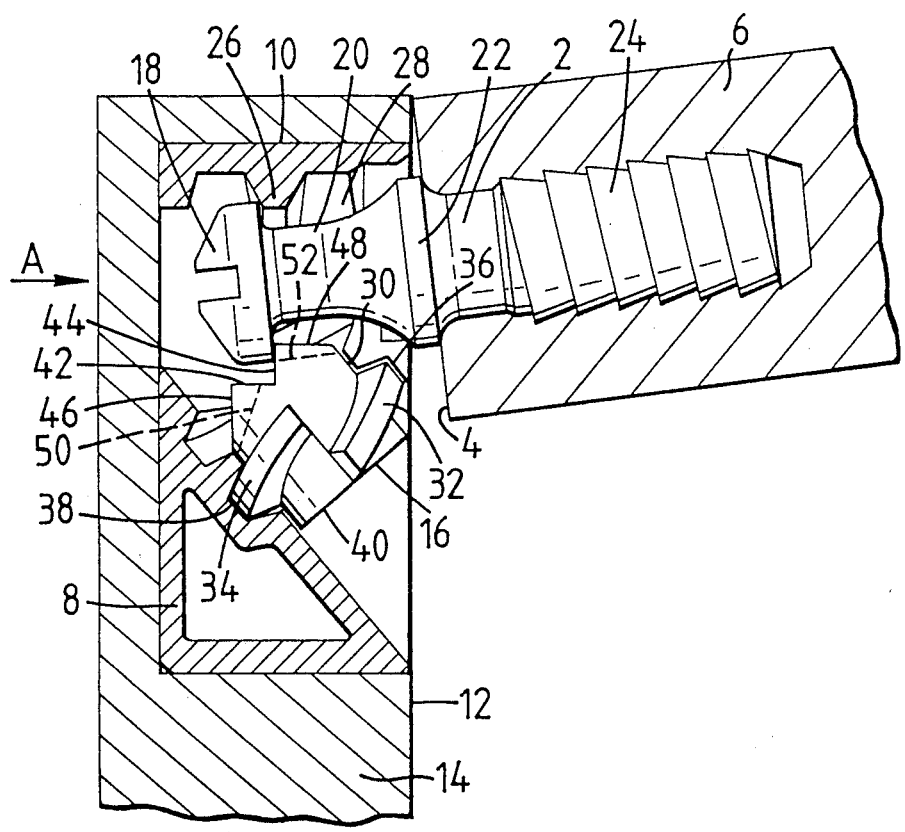
FIG. 1 shows in cross-section a joint including a joining device in accordance with the invention in its pre-located but untightened condition.

The joining device is of the general kind shown in U.S. Pat. No. 4,487,522, which is hereby incorporated herein by reference.

It consists of three components, namely an element having a head and a shank, in the form of a metal pin 2 which is driven into a pre-bored hole in the edge 4 of a panel 6, a body portion or plug 8 which is moulded from suitable plastics material and is fitted into a recess 10 in a major face 12 of the other panel 14, and a securing member in the form of a screw 16 which is located within the body member 8.

The pin 2 is substantially the same as the pins disclosed in the above-mentioned U.S. patent in that it has a head 18, an intermediate shank portion 20, a collar 22 which limits its depth of insertion into the panel 6, and a remaining shank portion 24 which is adapted to grip into the material of the panel 6.

The body portion 8 is generally similar to that shown in FIGS. 4, 5 and 6 of the above-mentioned U.S. patent and indeed may have additional features which are shown in that patent but not in the accompanying figures, such as being manufactured as a single part consisting of two halves hinged together with a plug and socket feature to hold them when the two halves are closed together by flexing the hinge, ribs and slots on the exterior to ensure a good grip within the recess 10 and to minimise the amount of material used in manufacture, and other details. In particular, as also shown in the abovementioned U.S. patent, the body portion 8 is formed with a projection 26 inside the opening 28 which accommodates the head of the pin 24 when it is inserted into the body portion 8, the projection 26 being located substantially opposite the securing member 16 and being of an arcuate form, tapering towards both ends, when viewed in plan i.e. in the direction of the arrow A in FIG. 1.

Figure 2:
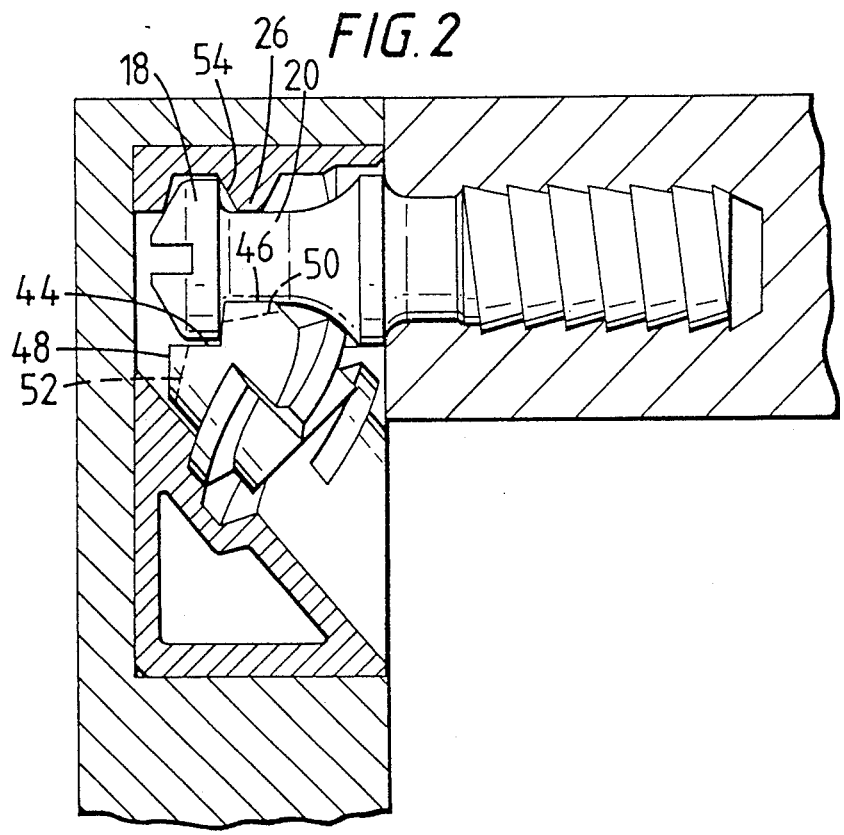
FIG. 2 shows the same joint after it has been tightened.
Figure 3:
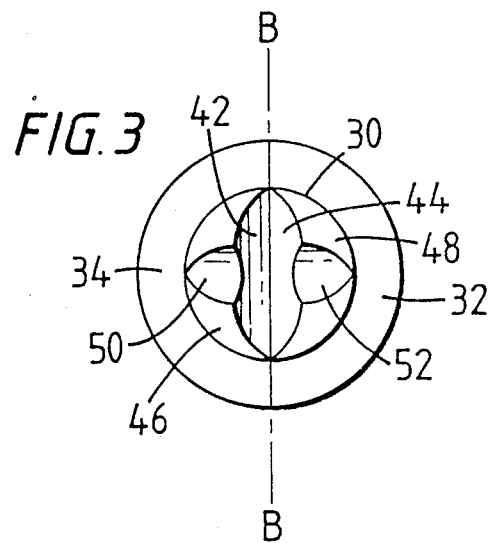
FIG. 3 is an axial view, taken looking towards the leading end, of the screw or securing member which forms part of the joining device shown in FIGS. 1 and 2.

The securing member or screw 16 has similarities with that shown in FIGS. 7a, b and c of the abovementioned U.S. patent but has various different features in accordance with the present invention. The design of the screw 16 will be explained with reference to FIGS. 1, 2 and 3. It is an integral metal moulding having a central body 30 and two thread portions 32 and 34 each extending 180° around the central body. Thread portions 32 and 34 are in effect portions of a double thread i.e. they fit into two different helical female thread grooves 36 and 38 moulded within the body portion 8 as shown in FIGS. 1 and 2. At its head end 40 the screw is formed with either a cross-shaped or a straight driving slot (not shown) so that it can be turned with a screw driver. The threads are designed so that it requires only a half turn from its initial assembled but untightened position as shown in FIG. 1 to its fully tightened position as shown in FIG. 2. The leading end of the screw has a special formation which comprises two radially inner surfaces 42 and 44 which in effect form the sides of a V-shaped groove as can be seen in FIGS. 1 and 2. It also has radially outward and generally conical surfaces 46 and 48 each of which is formed with a recess, 50 and 52. The screw is symmetrical about a plane B-B shown in FIG. 3 which contains its longitudinal axis, so that it can be set into the body portion 8 generally in the manner explained in U.S. Pat. No. 4,487,522 but in either of two orientations, in each of which it will operate in the same way.

The functioning of the device will now be explained. With the panels 6 and 14 separated, the pin and the body portion are inserted into their respective sockets in the panels, the screw 16 having been pre-assembled into the body portion during manufacture, in the position shown in FIG. 1. The two panels are then brought together so that the head 18 of pin 2 approaches the opening 28 in body portion 8. It can enter freely into the entrance of the opening, but the components are dimensioned and positioned so that the distance between the radially inward extremity of the projection 26 and the point where the two nearest surfaces 44 and 48 on the leading end of the screw meet, is slightly less than the diameter of the screw head 18. Consequently a degree of force has to be applied to force the screw head 18 to pass through this restriction. The resilience required to allow this to happen is given by the plastics material from which the body portion 8 is made. The head 18 then snaps in behind the projection 26 which lies to one side of the head, and the surface 44 at the leading end of the screw which lies at the opposite side of the opening 28 from the projection 26. In effect, projection 26 and surface 44 form a pair of shoulders behind which the screw head 18 snaps once it has been forced in.

When the joining device is in the pre-located position shown in FIG. 1, the head 18 is sufficiently firmly retained that gravity would not cause it to be pulled out of the body portion 8. A reasonable amount of force can also be applied to the panel 6 in either the upward or downward direction as viewed in FIG. 1, but this will force the under-side of the screw head 18 into firmer engagement behind, respectively, the surface 44 on the leading end of the screw or the rear surface of the projection 26, so that the pin head will not be levered out of the body portion 8. Hence, the pre-location achieved is for practical purposes very secure.

The joint is then tightened by turning the screw 16, using a screw driver, half a turn clockwise. The screw turns and moves forwards and during the initial movement the shoulder-forming surface 44 of the screw slides off the underside of the pin head 18 whilst the advancing and turning opposite surface 42 on the screw moves into engagement with the same part of the underside of the pin head 18 and, as the surface 42 moves forwards, draws the head 18 further inwardly within the opening 28 so as to tighten the joint. During the final part of the tightening movement the outwardly facing surface 46 at the leading end of the screw pushes laterally against the intermediate shank portion 20 of the pin (see FIG. 2) so that the head 18 is moved even further into engagement behind the projection 26. The rear surface 54 of projection 26 is inclined so that it exerts a camming action on the head 18 and helps to draw it further into the opening 28 on the side opposite the tightening screw 16. As the screw is approaching the position shown in FIG. 2, the shallow recess 50 in surface 46 starts to become opposite the intermediate shank portion 20, which then snaps into the recess 50, which thus serves as a detent effectively preventing further tightening of the screw 16 and also preventing the screw from becoming inadvertently loosened by vibration, or otherwise.

As just described, the screw surface 44 functions as the shoulder-forming portion of the screw for the purpose of pre-location, and the surface 42 serves the purpose of applying force to the screw head so as to tighten the joint, while the surface 46 and recess 50 took their part in the final stage of the tightening operation. Because of the symmetry of the screw about plane B-B, if the screw 16 had been placed in the female thread in the opposite (i.e. rotated 180° about its axis) position, the functions of those surfaces would have been carried out respectively by the surfaces 42, 44 and 48 and by the recess 52.

Two further features of the joining device should be mentioned. As the head 18 is being initially brought into the opening 28, the recess 52 in surface 48 of the screw 16 helps to guide it along a central path and also makes the amount of force required to achieve prelocation less than if the recess were not present. Also, to minimise the force needed upon initial insertion, whilst maintaining secure pre-location after insertion, the female threads 36 and 38 may be given a slightly larger maximum diameter near the head end of the screw 16 than they have near the leading end of the screw 16. This allows the screw 16 to tilt slightly in the anti-clockwise direction as viewed in FIG. 1 when the pin head 18 is being inserted past it, thus easing insertion, and to be tilted back in the clockwise direction by pressure from the underside of the pin head 18 after insertion, so as to move back to a position where secure pre-location is assured.

In a modified embodiment of the invention, the threads on the screw 16 and in the body portion 8 are designed so that the screw requires a full turn, instead of a half turn, in order to tighten the joint. Then, its leading end would have only a single projection instead of two e.g. the projection having the surfaces 44 and 48 but not the one having the surfaces 42 and 46. The surface 44 then serves as the shoulder-forming portion for pre-location. As the screw 16 is turned, surface 44 slides off the underside of the head 18, but towards the end of the full screw turn comes back towards and into engagement with the same part of the underside and serves also as the force-applying portion to tighten the joint.

We claim:

1. A joining device for joining panels at right angles to each other, comprising an element having a head and a shank and adapted to be secured into one of said panels with said head and part of the shank projecting from an edge thereof, a holding member adapted to be fitted in a recess provided in a major surface of the other of said panels, said holding member comprising a plug-like body portion having an end face arranged to be exposed at said major panel surface and having an opening extending therein axially from said end face to receive and surround said head, and means for achieving snap fitting of said head in said opening, said snap fitting means including an inward projection within said opening, and a securing member pre-assembled and thereby located within said body portion and adjacent to said opening, the securing member including means forming a shoulder-forming portion which, in a predetermined rotational position of the securing member within said body portion as a result of said pre-assembly, forms a shoulder on the other side of the opening relative to the projection, a distance between the shoulder-forming portion of the securing member and the projection on the body portion being less than the diameter of said head, for thereby enabling said head to be inserted into said opening and forced between the shoulder and the projection into a snap fitting location behind the shoulder and the projection, said securing member including tightening means in said securing member and adjacent the shoulder-forming means for engaging said head, during rotation of said securing means from said predetermined rotation position, to apply a force thereto to move said head inwardly relative to said opening to tighten the joint formed by said panels.

2. A joining device as claimed in claim 1, wherein said securing member is a screw whose axis is angled relative to the axis of said element, and which has a leading end which includes said shoulder-forming portion means located to one side of the screw axis and said tightening means including a force-applying portion located to the other side of the screw axis such that on turning the screw in a tightening direction said shoulder-forming portion moves out of engagement with said head and said force-applying portion moves into engagement with said head and applies the joint-tightening force thereto.

3. A joining device as claimed in claim 2, wherein the leading end of the screw has thereon, one to each side of a plane containing the axis of the screw, two surfaces which can each operate as one of a shoulder-forming portion and a force-applying portion, whereby the screw can be placed in the housing portion in either of two orientations about its own axis and one of said surfaces will act as the shoulder-forming portion and the other as the force-applying portion.

4. A joining device as claimed in claim 3, wherein said leading end of the screw has two forward facing projections, one to each side of said plane, and said surfaces are on the radially inward sides of the projections.

5. A joining device as claimed in claim 4, wherein the radially outward sides of the projections are arranged so that either of them will, in use, push said element laterally as the screw is tightened.

6. The joining device of claim 1, wherein said tightening means includes a first cam surface means for engaging to move said head inwardly relative to said opening, and said securing means further includes a second cam surface means adjacent said tightening means for engaging to move said head laterally relative to said opening, to push said head further into engagement behind said projection.

7. The device of claim 6, wherein said securing member is threadedly received in said body portion, threads in said body portion receiving the securing member having a larger maximum diameter in a forward threaded portion of the body portion than in a rear portion of the body portion furthest from the head end to enable tilting of the securing member as the head is inserted past the shoulder and projection into snap fitting location behind the projection and shoulder.

8. A joining device for joining panels at right angles to each other, comprising an element having a head and a shank and adapted to be secured into one of said panels with said head and part of the shank projecting from an edge thereof, a holding member adapted to be fitted in a recess provided in a major surface of the other of said panels, said holding member comprising a plug-like body portion having an end face arranged to be exposed at said major panel surface and having an opening extending therein axially from said end face to receive and surround said head, an inward projection within said opening, and a securing member located within said body portion and adjacent to said opening, the securing member including means forming a shoulder-forming portion which, in a predetermined rotational position of the securing member within said body portion, forms a shoulder on the other side of the opening relative to the projection, a distance between the shoulder-forming portion of the securing member and the projection on the body portion being less than the diameter of said head, for enabling said head to be inserted into opening and forced between the shoulder and the projection into a snap fitting location behind the shoulder and the projection, said securing member including tightening means in said securing member and adjacent the shoulder-forming means for engaging said head, during rotation of said securing means from said predetermined rotation position, to apply a force thereto to move said head inwardly relative to said opening to tighten the joint formed by said panels, wherein said securing member is a screw whose axis is angled relative to the axis of said element, and which has a leading end which includes said shoulder-forming portion means located to one side of the screw axis and said tightening means including a force-applying portion located to the other side of the screw axis such that on turning the screw in a tightening direction said shoulder-forming portion moves out of engagement with said head and said force-applying portion moves into engagement with said head and applies the joint-tightening force thereto, wherein the leading end of the screw has thereon, one to each side of a plane containing the axis of the screw, two surfaces which can each operate as one of a shoulder-forming portion and a force-applying portion, whereby the screw can be placed in the housing portion in either of two orientations about its own axis and one of said surfaces will act as the shoulder-forming portion and the other as the force-applying portion, wherein said leading end of the screw has two forward facing projections, one to each side of said plane, and said surfaces are on the radially inward sides of the projections, wherein the radially outward sides of the projections are arranged so that either of them will, in use, push said element laterally as the screw is tightened wherein the radially outward sides of the projections also each include a recess, either of which recesses acts as a detent in co-operation with the screw shank when the screw is tightened.

9. A joining device for joining panels at right angles to each other, comprising an element having a head and a shank and adapted to be secured into one of said panels with said head and part of the shank projecting from an edge thereof, a holding member adapted to be fitted in a recess provided in a major surface of the other of said panels, said holding member comprising a plug-like body portion having an end face arranged to be exposed at said major panel surface and having an opening extending therein axially from said end face to receive and surround said head, an inward projection within said opening, and a securing member located within said body portion and adjacent to said opening, the securing member including means forming a shoulder-forming portion which, in a predetermined rotational position of the securing member within said body portion, forms a shoulder on the other side of the opening relative to the projection, a distance between the shoulder-forming portion of the securing member and the projection on the body portion being less than the diameter of said head, for enabling said head to be inserted into said opening and forced between the shoulder and the projection the into a snap fitting location behind the shoulder and the projection, said securing member including tightening means adjacent the shoulder-forming means for engaging said head, during rotation of said securing means from said predetermined rotation position, to apply a force thereto to move said head inwardly relative to said opening to tighten the joint formed by said panels, further including a recess formed in the leading end of the securing member, said recess being aligned with the shank of said element when the securing member is in said predetermined rotational position to provide a passage through which a portion of said head moves towards the shoulder during insertion of said head between the shoulder and said projection.

* * * * *